United States Patent [19]
Avis

[11] 3,773,612
[45] Nov. 20, 1973

[54] GLYOXAL-ACRYLAMIDE-FORMALDEHYDE-UREA WET STRENGTH RESIN

[75] Inventor: Robert P. Avis, West Chester, Pa.

[73] Assignee: Scott Paper Company, Delaware County, Pa.

[22] Filed: Jan. 17, 1973

[21] Appl. No.: 324,546

[52] U.S. Cl............... 162/168, 162/166, 162/167, 260/29.4 R, 260/29.4 UA, 260/68, 260/70 R
[51] Int. Cl............................................. D21h 3/38
[58] Field of Search................. 162/166, 167, 168; 260/29.4 R, 70 R, 68, 29.4 UA

[56] References Cited
UNITED STATES PATENTS
3,427,122   2/1969   Talet................................. 260/70 R
3,556,932   1/1971   Coscia............................... 162/166

Primary Examiner—S. Leon Bashore
Assistant Examiner—Peter Chin
Attorney—Nicholas J. De Benedictis et al.

[57] ABSTRACT

A wet strength resin having synergistic properties consists of a polymer of glyoxal, acrylamide, formaldehyde and urea. The formaldehyde, urea, glyoxal and acrylamide are present in the following mole ratios: formaldehyde to urea, from about 1:1 to about 5:1; formaldehyde to urea and acrylamide, from about 0.2-5:1 to about 2.5:1 and glyoxal to acrylamide of from about 0.2:1 to about 1.14:1. The resin possesses synergistic properties with respect to its performance in imparting wet strength to cellulosic sheet materials under alkali conditions in relation to the properties imparted by urea-formaldehyde resins or glyoxal-acrylamide resins. The cellulosic sheet material produced with said wet strength resins possess good off-machine wet strength.

9 Claims, No Drawings

GLYOXAL-ACRYLAMIDE-FORMALDEHYDE-UREA WET STRENGTH RESIN

BACKGROUND OF THE INVENTION

1. Field of the Invention

This invention relates to novel resins for imparting wet strength to cellulosic sheet materials and to cellulosic sheet materials containing said resins. Specifically, glyoxal-acrylamide-formaldehyde-urea resins can be used in the production of cellulosic sheet materials to impart wet strength, especially high initial alkali wet strength directly off the machine which further improves upon aging.

2. Description of the Prior Art

The production of sheet materials from cellulosic fibers generally begins with an aqueous slurry of the fibers which is commonly referred to as a furnish. The aqueous furnish is cast onto a wire surface to remove the water and bring the fibers into close contact with one another to produce the cellulosic sheet material. While in close contact, the cellulosic fibers form hydrogen bonds between hydroxyl groups of adjacent fibers resulting in the production of sheet material having strength derived from natural fiber to fiber bonding. The disadvantage of such natural fiber to fiber bonding is that the bonds are broken and the cellulosic sheet material loses most of its strength when exposed to water.

To prevent this strength loss various chemical treatments have been employed. Among the more successful treatments is the addition of synthetic resins to the cellulosic fibers either before or after the fibers are formed into a sheet, followed by curing or polymerizing the resin which significantly increases the wet strength of the sheet. Such resins are commonly referred to as wet strength resins and include cationic ureaformaldehyde and melamine-formaldehyde type resins; polyamide-epichlorohydrin resins and glyoxal-vinylamide resins.

In order to impart wet strength, most resins must be cured. In the case of urea-formaldehyde resins, the curing is usually done by aging the cellulosic sheet material for 6 to 8 weeks during which time the strength of the material increases significantly as the urea-formaldehyde resin cures at ambient temperatures. This curing can be accomplished rapidly (minutes) by using a difficult heat curing step during the production of the paper.

Despite the difficulty with curing, urea-formaldehyde resins are still used on commercial cellulosic sheet materials because of low cost and excellent wet strengthening of the cellulosic sheet material, even under mild alkali conditions after the resin has aged.

The application of heat or a prolonged storage period for strength development of urea-formaldehyde type resins is a serious handicap to rapid production and creates inventory problems, especially in the winter season in northern climes. Due to high consumer demand for some paper products, there is at times less than 6 to 8 weeks between production of the product and ultimate use by the consumer. This necessitates the more expensive and difficult elevated temperature curing to reduce curing time since there is insufficient time between manufacture and consumer use for curing.

To overcome these problems, resins formed by reacting glyoxal with vinylamide polymers, such as those disclosed in U.S. Pat. No. 3,556,932 have been suggested. Such resins formed by reacting glyoxal with polyvinylamides yield cellulosic products having immediate high off-machine wet tensile and improved dry tensile strength. However, papers incorporating such resins rapidly lose wet strength under mild alkaline conditions which are often encountered in household cleaning solutions such as ammonia, certain soaps and other similar cleaners.

SUMMARY OF THE INVENTION

The present invention provides a substantive resin that imparts wet strength to paper products (cellulosic sheet materials) with the advantages of high initial off-machine wet strength, high dry strength and improved wet alkali strength. The resin is a polymer of glyoxal, acrylamide, formaldehyde and urea and demonstrates a synergistic combination of the beneficial properties of glyoxal-acrylamide resins and urea-formaldehyde resins with respect to immediate off-machine alkali wet strength while retaining the other beneficial properties of both resins to a significant extent. This invention also provides cellulosic sheet materials having said resins.

DESCRIPTION OF THE PREFERRED EMBODIMENT OF THE INVENTION

According to the present invention a solution of a glyoxal-acrylamide-formaldehyde-urea polymer is prepared and used as a wet strength resin in the production of cellulosic sheet materials. The glyoxal-acrylamide-urea-formaldehyde resin can be prepared according to standard procedures for producing copolymer resins. Furthermore, usual extenders or modifiers employed in urea-formaldehyde resins can be used in similar quantities in the polymer of the present invention.

Although polymer resins can be made having almost any desired proportion of urea-formaldehyde to glyoxal-acrylamide, in order to possess the synergism of the present invention, the total percentage of urea and formaldehyde added in making the resin should be from about 30 to 70 percent based upon the weight of nonvolatile solids in the resulting resins. Resins containing less than about 30 percent urea-formaldehyde will not develop outstanding ammonia strength while those resins containing more than about 70 percent urea-formaldehyde will not have good off-machine wet tensile strength.

The mole ratio of formaldehyde to urea should be from about 1:1 to about 5:1 with about 3 moles of formaldehyde per mole of urea being preferred. Some or all of the urea may be replaced with melamine.

The polymer of the present invention should have a mole ratio of formaldehyde to urea plus acrylamide of from about 0.25:1 to about 2.5:1 with ratios of about 0.5:1 to about 1.54:1 being preferred.

In addition to the above ratios which are based upon the moles of reactants used to make the polymer, the polymer should also have a mole ratio of glyoxal to acrylamide of from about 0.2:1 to about 1.14:1 with about 0.5 moles of glyoxal per mole of acrylamide being particularly preferred.

In addition to the above ingredients it is also necessary for the polymer to be substantive to cellulosic fibers. This is usually accomplished by the addition of between about 0.001 to about 0.05 moles of a basic monomer such as N,N-dimethylaminoethylmethacrylate, N,N-diethylaminoethylmethacrylate, N,N-dimethylaminoethacrylate, N,N-diethylaminoethacrylate, 2-vinylpyridine, 4-vinylpyridine, and N-(t- butyl)-aminoethylmethacrylate. The function of this basic monomer (usually a nitrogen containing monomer) is to impart a cationic character to the resulting polymer resin in order that the polymer resin will be substantive to cellulosic fibers. The amount of the basic monomer may be from about 0.0005 moles to about 0.05 moles for each mole of acrylamide employed. Preferably the amount is from about 0.001 moles to about 0.01 moles for each mole of acrylamide.

The resins can be produced according to standard procedures. Preferably about 0.03 percent by weight of sodium bisulfite based upon the total weight of acrylamide is added to promote formation of the polymer. The presence of ammonium persulfate or similar free radical initiators usually is necessary in order to produce the polymer and is usually added in an amount equal to about 0.03 percent of the total weight of acrylamide used.

Although the polymerization reaction can be carried out in an aqueous medium, it has been found that better reaction control is obtained when an aliphatic alcohol is present. Preferably, the reaction is carried out in the presence of about 4 percent to about 15 percent isopropyl alcohol.

Preferably the polymer of the present invention is produced by reacting acrylamide, formaldehyde and glyoxal in the presence of isopropyl alcohol, water and N,N dimethylaminoethylmethacrylate to form the methylolated and glyoxalated acrylamide. The methylolation and glyoxalation reactions are preferably carried out at a pH range of from about 8 to about 9 for about 10 to 15 minutes and at temperatures of from about 75°C to about 87°C. After the methylolation and glyoxalation reactions, the pH is adjusted downward to between about 3.0 and about 5.0, preferably with dilute (10 percent) sulfuric acid and the condensation polymerization reaction is allowed to take place for about 5 minutes to about 10 minutes at temperatures of from about 75°C to 80°C. Thereafter, additional acrylamide is added along with some urea and water to the reaction mixture and the mixture maintained between about 75°C and about 80°C for approximately 5 minutes to permit the acid condensation polymerization reaction between the glyoxalated and methylolated acrylamide and the newly added urea and acrylamide to proceed. During this time sodium bisulfite may be added to promote the reaction while near the end of the acid condensation polymerization period, ammonium persulfate may be added to initiate free radical polymerization of the vinyl components of the system. The simultaneous free radical and acid condensation polymerization reactions are permitted to continue until the reactants reach a viscosity just short of gelation. At this point the reaction mixture is substantially diluted preferably with water and hydroquinone which stops the reactions. The final resin solution should have a viscosity of from about 10 to about 25 centistokes at 25°C with a non-volatile solids content (NVS) of up to about 20 percent and preferably about 10 percent, and the resin should have a pH of from about 3 to about 4. A resin having the above properties is a thermosetting, cationic, water-soluble polymer that when combined with cellulosic fibers and cured onto a cellulosic sheet material imparts good immediate off-machine wet strength, even under alkali conditions and upon natural aging will develop improved paper properties. Furthermore, such a resin solution is stable and can be stored without gellation taking place for prolonged periods at ambient temperature.

The methylolation and glyoxalation reactions discussed above should be carried out under alkali conditions, while the subsequent condensation polymerization and free radical polymerization reactions should be carried out under acidic conditions. The time and temperature requirements for the methylolation-glyoxalation acidic condensation polymerization and free radical polymerization reactions are interdependent variables for the reactions, in the sense that the same reactions can be carried out at lower temperatures for longer periods of time or at higher temperatures for shorter periods of time with essentially the same results. Specific times and/or temperatures are not critical to the preparation of resins in accordance with the present invention.

Resins prepared in accordance with this process can be incorporated into cellulosic sheet materials (paper) by adding them to aqueous suspensions of stock or furnish having an acidic pH, preferably about 4.0 and added directly into the beater, stock chest, jordan, fan pump, head box or at any other suitable point ahead of the fourdrinier wire or sheet-forming stage. While these resins are primarily intended for use as a beater-additive type of wet strength producing resin, they may also be incorporated into an already formed paper sheet by padding, spraying, immersing, printing, etc. An advantageous amount of resin added to the paper sheet constitutes from about 0.1 percent to about 10.0 percent resin solids based on the dry weight of the paper. A range of from about 0.1 percent to about 6.0 percent is preferred. However, the amount may be varied to suit the particular need with regards to the amount of wet strength desired and the contemplated end use of the paper product.

The resins of the present invention demonstrate a synergistic combination of wet strength properties under alkali conditions in comparison to glyoxal-acrylamide resins, such as those disclosed in U.S. Pat. No. 3,556,932 and urea-formaldehyde resins. With reference to the Table on the last page of the specification, the wet strength under alkali conditions of papers treated with urea-formaldehyde, glyoxal-acrylamide, and resins of the present invention, respectively, are shown to vary with age from the wet strength values initially off the machine (corresponding to time zero) to the wet strength attained after 8 weeks of aging. As can be seen, the glyoxal-acrylamide resin does not possess very much wet strength under alkali conditions (as stated in U.S. Pat. No. 3,556,932), while the urea-formaldehyde resin only attains alkali wet strength with age. Surprisingly, the polymer of such resins, namely, the polymer of the present invention produces paper that has significant wet strength even under alkali conditions immediately off the machine (times zero) which strength improves with aging. It is surprising that a polymer of resins neither of which possess much off-machine wet strength under alkali conditions would result in a polymer having good off-machine wet strength under alkali conditions.

All proportions used herein are by weight unless indicated.

EXAMPLE I

Into a reaction flask equipped with a mechanical stirrer, thermometer, addition funnel and reflux condenser were placed 18.0 grams of acrylamide, 36.0 grams of a 40 percent by weight solution of glyoxal in water, 75.0 grams of 99 percent isopropyl alcohol, 50.0 grams of 37 percent formaldehyde (balance $H_2O$) 200.0 grams of water and 1.3 grams of N,N-dimethylaminoethylmethacrylate. The reaction mixture was slowly heated and maintained between 75°C and 80°C for about 10 minutes, at which point the pH of the mixture was adjusted from about 8.5 to about 4.0 with 4 milliliters of 10 percent sulfuric acid and the mixture was maintained between 78°C and 82°C for 5 minutes. At the end of this time 18.0 grams of acrylamide, 12.0 grams of urea, 0.1 grams of sodium bisulfite and 100.0 grams of water were added and the mixture was maintained between 72°C and 87°C for an additional 8 minutes. Then 10 cc. of a 0.125 percent aqueous solution of ammonium persulfate was added as a free radical initiator and the mixture was maintained between 85°C and 87°C until the resin solution became a viscous syrup at the point if incipient gelation (about 37 minutes) at which point 385.0 grams of water and 1.5 grams of hydroquinone were added to thin out the mixture and prevent further polymerization. The resultant polymer solution when cooled to 25°C had a viscosity of 17.4 centistokes, a pH of 3.4, and a non-volatile solids content of 8.6 percent. The polymer had a urea-formaldehyde content of 37 percent and a glyoxal-acrylamide content of 63 percent based upon the weight of non-volatile solids in the polymer solution.

EXAMPLE II

Into a reaction flask equipped with a mechanical stirrer, thermometer, addition funnel and reflux condenser were placed 18.0 grams of acrylamide, 36.0 grams of a 40 percent by weight solution of glyoxal in water, 75.0 grams of 99 percent isopropyl alcohol, 75.0 grams of 37 percent formaldehyde, 175.0 grams of water and 1.3 grams of N, N-dimethylaminoethylmethacrylate. The reaction mixture was slowly heated and maintained between 75°C and 80°C for about 10 minutes at which point the pH of the mixture was adjusted to about 4.0 with 4 milliliters of 10 percent sulfuric acid and the mixture was maintained between 78°C and 82°C for 5 minutes. At the end of this time 18.0 grams of acrylamide, 18.0 grams of urea, 0.1 grams of sodium bisulfite and 100.0 grams of water were added and the mixture was maintained between 72°C and 87°C for an additional 8 minutes. Then 10 cc. of a 0.125 percent aqueous solution of ammonium persulfate was added as a free radical initiator and the mixture was maintained between 85°C and 87°C until the resin solution became a viscous syrup at the point of incipient gelation (about 44 minutes) at which point 385.0 grams of water and 1.5 grams of hydroquinone were added to thin out the mixture and prevent further polymerization. The resultant polymer solution when cooled to 25°C had a viscosity of 15.9 centistokes, a pH of 3.3, and a non-volatile solids content of 9.4 percent. The polymer had a urea-formaldehyde content of 44 percent and a glyoxal-acrylamide content of 56 percent based upon the weight of non-volatile solids in the polymer solution.

EXAMPLE III

Into a reaction flask equipped with a mechanical stirrer, thermometer, addition funnel and reflux condenser were placed 18.0 grams of acrylamide, 36.0 grams of a 40 percent by weight solution of glyoxal in water, 75.0 grams of 99 percent isopropyl alcohol, 100.0 grams of 37 percent formaldehyde, 150.0 grams of water and 1.3 grams of N,N-dimethylaminoethylmethacrylate. The reaction mixture was slowly heated and maintained between 75°C and 80°C for about 10 minutes, at which point the pH of the mixture was adjusted to about 4.0 with 4 milliliters of 10 percent sulfuric acid and the mixture was maintained between 78°C and 82°C for 5 minutes. At the end of this time 18.0 grams of acrylamide, 24.0 grams of urea, 0.1 grams of sodium bisulfite and 100.0 grams of water were added and the mixture was maintained between 72°C and 87°C for an additional 8 minutes. Then 10 cc. of a 0.125 percent aqueous solution of ammonium persulfate was added as a free radical initiator and the mixture was maintained between 85°C and 87°C until the resin solution became a viscous syrup at the point of incipient gelatin (about 85 minutes) at which point 385.0 grams of water and 1.5 grams of hydroquinone were added to thin out the mixture and prevent further polymerization. The resultant polymer solution when cooled to 25°C had a viscosity of 15.5 centistokes, a pH of 3.3, and a non-volatile solids content of 10.7 percent. The polymer had a urea-formaldehyde content of 54 percent and a glyoxal-acrylamide content of 46 percent based upon the weight of non-volatile solids in the polymer solution.

EXAMPLE IV

Into a reaction flask equipped with a mechanical stirrer, thermometer, addition funnel and reflux condenser were placed 18.0 grams of acrylamide, 36.0 grams of a 40 percent by weight solution of glyoxal in water, 75.0 grams of 99 percent isopropyl alcohol, 125.0 grams of 37 percent formaldehyde, 125.0 grams of water and 1.3 grams of N,N-dimethylaminoethylmethacrylate. The reaction mixture was slowly heated and maintained between 75°C and 80°C for about 10 minutes at which point the pH of the mixture was adjusted to about 4.0 with 4 milliliters of 10 percent sulfuric acid and the mixture was maintained between 78°C and 82°C for 5 minutes. At the end of this time 18.0 grams of acrylamide, 30.0 grams of urea, 0.1 grams of sodium bisulfite and 100.0 grams of water were added and the mixture was maintained between 72°C and 87°C for an additional 8 minutes. Then 10 cc. of a 0.125 percent aqueous solution of ammonium persulfate was added as a free radical initiator and the mixture was maintained between 85°C and 87°c until the resin solution became a viscous syrup at the point of incipient gelation (about 69 minutes) at which point 385.0 grams of water and 1.5 grams of hydroquinone were added to thin out the mixture and prevent further polymerization. The resultant polymer solution when cooled to 25°C had a viscosity of 18.0 centistokes, a pH of 3.4, and a non-volatile solids content of 11.4 percent. The polymer had a urea-formaldehyde content of 59 percent and a glyoxal-acrylamide content of 41 percent based upon the weight of non-volatile solids in the polymer solution.

EXAMPLE V

Cellulosic sheet material in the form of hand sheets were made having a weight of 20 pounds per ream and prepared on a Noble and Wood hand sheet machine (without a white water system) from bleached West Coast sulfite pulp having a Canadian freeness of 450 to 500 cc. The hard sheets were made from a slurry containing sufficient resin so that the resulting hand sheet had 2 percent resin based on the dry weight of fiber. Six different resins were used to produce these hand sheets. There resins were the four resins produced in Examples I through IV, a commercially available glyoxal-acrylamide resin available from American Cyanamide and produced according to U.S. Pat. No. 3,556,932 and a urea-formaldehyde resin produced according to U.S. Pat. No. 3,275,605. During the making of the hand sheets the pH of the pulp or dilute sodium hydroxide solution as required. The resulting hand sheets were then measured for tensile strength on an Instion model TM instrument. Strips of each hand sheet were tested after the hand sheet was made and the strength test was repeated after various periods of aging (one week, two weeks, four weeks and eight weeks). Three different different tensile strengths were measured, these being a wet tensile (WT), a dry tensile (DT), and an alkali tensile (AT). The wet tensile was measured by soaking a strip of the hand sheet in water and then measuring the tensile of the hand sheet on the Instion tensile measuring machine. Likewise, the alkali wet strength was measured by soaking a strip of the hand sheet for 10 minutes in a household ammonia containing approximately 4.5 percent $NH_3$ and then measuring the tensile of the soaked strip. The dry tensile was measured by testing a strip of the hand sheet without any soaking. The results are reported in Table 1 appearing on the last page of this specification. All tensile values are reported as ounces per inch. Also reported in the table are the tensile strength measurements of a control sample which consisted of a hand sheet of the identical pulp used in producing the resin impregnated hand sheets but without any resin added to the pulp slurry.

As can be seen from the table, hand sheets made with resins of the present invention (samples I through IV), have an alkali tensile strength that is superior to either the urea-formaldehyde resin or the glyoxal-acrylamide resin impregnated hand sheets at times zero (immediately off the papermaking machine) and for a substantial aging period thereafter. Wet strength under alkali conditions is a valuable property for paper products, especially those products that will be subjected to cleaning solutions, especially ammonia solutions, soap solutions and the like during the use of the paper product. Furthermore, the development of this wet strength under alkali conditions soon after the paper is produced eliminates the commercial problem of a consumer purchasing the paper product and using it before it has had sufficient time to age and obtain the desired strength characteristics. Furthermore, the high initial wet strength in comparison to urea-formaldehyde assists in handling the paper during production since the paper is stronger.

TABLE

| Resin | 0 weeks | | | 1 week, oz. A.T. | 2 week, oz. A.T. | 4 week, oz. A.T. | 8 week, oz. A.T. |
| --- | --- | --- | --- | --- | --- | --- | --- |
| | Oz. W.T.[1] | Oz. D.T.[2] | Oz. A.T.[3] | | | | |
| Control | 2.3 | 118.4 | 2.8 | 3.2 | 3.0 | 3.4 | 4.0 |
| Glyoxal acrylamide | 41.9 | 146.1 | 3.1 | 5.7 | 5.2 | 6.1 | 6.2 |
| Example: | | | | | | | |
| I | 32.7 | 132.8 | 4.5 | 13.7 | 18.4 | 17.1 | 19.7 |
| II | 34.2 | 168.0 | 7.1 | 16.4 | 19.4 | 16.9 | 22.9 |
| III | 29.2 | 134.4 | 8.0 | 17.4 | 26.5 | 21.9 | 24.3 |
| IV | 25.5 | 125.1 | 12.5 | 25.2 | 24.3 | 21.4 | 24.8 |
| Ureaformaldehyde | 3.8 | 111.4 | 3.0 | 10.8 | 10.7 | 19.0 | 26.5 |

[1] Wet tensile.
[2] Dry tensile.
[3] Alkali tensile.

I claim:
1. A urea, formaldehyde, glyoxal, acrylamide wet strength resin that is substantive to cellulosic sheet material and having;
   from about 30 percent to about 70 percent of urea and formaldehyde based upon the non-volatile weight of the resin;
   a mole ratio of formaldehyde to urea of from about 1:1 to about 5:1;
   a mole ratio of formaldehyde to urea and acrylamide of from about 0.25:1 to about 2.5:1; and
   a mole ratio of glyoxal to acrylamide of from about 0.2:1 to about 1.14:1.
2. The resin of claim 1 in which the percentage of urea and formaldehyde is from about 37 percent to about 59 percent.
3. The resin of claim 1 in which the mole ratio of formaldehyde to urea is about 3.0.
4. The resin of claim 1 in which the mole ratio of formaldehyde to urea and acrylamide is from about 0.5 to about 1.54.
5. The resin of claim 1 in which the mole ratio of glyoxal to acrylamide is about 0.5.
6. The resin of claim 1 in an aqueous solution having a viscosity of from about 10 to about 25 centistokes at 25°C; a non-volatile resins content of up to about 20 percent and a pH of from about 3.0 to about 4.0.
7. The resin solution of claim 5 in which the non-volatile content is about 10 percent.
8. A cellulosic sheet material having from about 0.01 percent to about 10 percent of the resin of claim 1 based upon the dry weight of the cellulosic sheet material.
9. The cellulosic sheet material of claim 8 wherein the amount of resin is about 2 percent.

* * * * *